US006314557B1

(12) United States Patent
Shenderovich

(10) Patent No.: US 6,314,557 B1
(45) Date of Patent: Nov. 6, 2001

(54) HYBRID COMPUTER PROGRAMMING ENVIRONMENT

(75) Inventor: Georgiy Shenderovich, Petah-Tikva (IL)

(73) Assignee: Infineon Technologies Development Center Tel Aviv LTD, Tel Aviv (IL)

( * ) Notice: Subject to any disclaimer, the term of this patent is extended or adjusted under 35 U.S.C. 154(b) by 0 days.

(21) Appl. No.: 09/210,542

(22) Filed: Dec. 14, 1998

(51) Int. Cl.[7] .................................................. G06F 9/45
(52) U.S. Cl. ............................ 717/4; 717/2; 717/5; 717/9
(58) Field of Search ............................... 717/4, 2, 5, 9, 717/6, 7; 714/38

(56) References Cited

U.S. PATENT DOCUMENTS

| | | | |
|---|---|---|---|
| 5,132,972 | * | 7/1992 | Hansen ..................................... 714/38 |
| 5,175,856 | * | 12/1992 | Dyke et al. .............................. 717/4 |
| 5,179,702 | * | 1/1993 | Spix et al. ............................. 709/102 |
| 5,261,055 | | 11/1993 | Moran et al. .......................... 710/38 |
| 5,392,036 | | 2/1995 | Klein ..................................... 341/51 |
| 5,404,485 | | 4/1995 | Ban ..................................... 711/202 |
| 5,408,637 | | 4/1995 | Shimizu ................................. 703/25 |
| 5,430,862 | | 7/1995 | Smith et al. ........................... 703/26 |
| 5,594,890 | | 1/1997 | Yamaura et al. ...................... 703/23 |
| 5,668,989 | * | 9/1997 | Mao ..................................... 707/101 |
| 5,740,469 | * | 4/1998 | Yin et al. .............................. 710/65 |
| 5,805,893 | * | 9/1998 | Sproul et la. ............................ 717/5 |
| 5,832,273 | * | 11/1998 | Mizuse ................................... 717/9 |
| 5,860,008 | * | 1/1999 | Bradley ................................... 717/4 |
| 5,933,642 | * | 8/1999 | Greenbaum et al. .................... 717/9 |
| 6,014,513 | * | 1/2000 | Voelker et al. .......................... 717/3 |
| 6,021,275 | * | 2/2000 | Horwat ................................... 717/7 |
| 6,083,278 | * | 7/2000 | Olson et al. ............................. 717/2 |
| 6,141,791 | * | 10/2000 | Takuma et al. ......................... 717/4 |
| 6,173,441 | * | 1/2001 | Klein ..................................... 717/5 |
| 6,233,545 | * | 5/2001 | Datig ..................................... 704/2 |

FOREIGN PATENT DOCUMENTS 90114711.6      7/1990   (EP) .

OTHER PUBLICATIONS

Title: Emulation Shortens time–to–market, Source Electronic Engineering Times, Jul., 1993, AN: 93: 751457.*
Title: Memory Efficient Software Synthesis from Data flow Graph, Dec., 1998. Source ACM, Author: Sng et al.*
Title: A Software Engineering experiment in Software Component Generation. author: Kieburtz et al, source; ACM, 1996.*

* cited by examiner

Primary Examiner—Mark R. Powell
Assistant Examiner—Chameli C. Das
(74) Attorney, Agent, or Firm—Mark M. Friedman

(57) ABSTRACT

A system for facilitating assembly language programming by providing a sophisticated hybrid programming environment comprising a module to parse input hybrid source code files containing at least one high-level instruction; a library of functions for defining at least one assembly-language instruction in the hybrid source code file from a corresponding high-level instruction; a module for translating the high-level instructions into machine language instructions according to the library; and a module to output the translated machine language instructions into an object file.

2 Claims, 1 Drawing Sheet

HYBRID COMPUTER PROGRAMMING ENVIRONMENT

FIELD AND BACKGROUND OF THE INVENTION

The present invention relates to computer programming language environments, and in particular, it concerns a system to facilitate the writing and debugging of assembly language programs.

Assembly language programming is a particularly difficult task for both the code writing and debugging phases of the programming process. High-level languages, such as C++, can be used to write programs which describe algorithms in terms of abstract symbols which are relatively close to human languages. Assembly languages, on the other hand, are mechanical in nature, and describe algorithms only in terms of simple microprocessor instructions. Therefore, assembly language programs are usually longer and more difficult to understand than programs written in high-level languages.

The debugging process is especially difficult for assembly language programming. Debugging is a process which involves testing a computer program for errors (bugs) which cause the program to give results not in accordance with its design specifications. Errors can result from flaws in the underlying algorithm used as the basis of a program, or from the incorrect execution of the algorithm. On seeing such erroneous results, software engineers find the sections of the computer program which contain the errors and rewrite them. The engineers then recompile the program and test it again. This debugging process is repeated until the errors are removed from the program.

The debugging process is relatively difficult for assembly language programs because the underlying algorithm is obscured by the large number of mechanical, microprocessor-specific instructions, whereas in high-level languages the underlying algorithm is easy to identify. Also, current assembly language programming environments do not provide many of the features commonly found in high-level programming environments. As an example, high-level languages and programming environments have numerous features that facilitate the handling of files stored on hard disks. These files can be used to store the results of test output produced by programs as they are being debugged.

Another problem with the debugging process for assembly language programs is that each assembly language has its own set of debugging programs, requiring software engineers to learn how to use a new set of debugging programs each time a new microprocessor is developed.

The most accurate tool to examine the execution of assembly language programs, an emulator, is a special hardware device that attaches directly to the microprocessor in which the assembly language is used, in order to continuously monitor the state of the inputs and outputs of the microprocessor. These devices are expensive, and are not always available in the early stages of microprocessor development, causing delays in software development.

European Patent Application 90114711 describes a specialized development computer which is used to translate control programs written in high-level languages to machine language, and transfer the machine language control programs to a development microprocessor. Although this does facilitate the development process somewhat, it does not provide for the writing, testing, and debugging of programs which include both high-level language and assembly language instructions in a single program. In addition, this development method requires specialized hardware and an extra development computer for the interface.

A more efficient system would require less specialized electronic hardware. Such a system would be implemented for use on general purpose personal computers, allowing companies to apply and take advantage of the existing personal computer skills of their staff for the tasks of writing and debugging assembly language programs. A more efficient system would also make all the tools in the competitive high-level programming language market available for use in assembly language programming.

There is therefore a need for a system that brings the ease of writing and debugging high-level language programs to assembly language programs.

SUMMARY OF THE INVENTION

It is an object of the present invention to provide a sophisticated assembly language programming environment that facilitates the writing and debugging of assembly language programs. This object is attained by providing a hybrid programming environment which can compile programs containing both high-level programming language instructions and assembly language programming instructions.

According to the teachings of the present invention there is provided a system for facilitating assembly language programming by providing a sophisticated hybrid programming environment comprising a module to parse input hybrid source code files containing at least one high-level instruction; a library of functions for defining at least one assembly-language instruction in the hybrid source code file from a corresponding high-level instruction; a module for translating the high-level instructions into machine language instructions according to said library; and a module to output the translated machine language instructions into an object file.

According to the teachings of the present invention there is also provided a method for handling hybrid source code files containing any number of high-level and assembly language instructions, comprising parsing input hybrid source code files containing at least one high-level instruction; converting assembly language instructions in a hybrid source code file into high-level language instructions; translating high-level instructions into machine language instructions; and compiling the translated machine language instructions into an object file.

According to the teachings of the present invention there is also provided a method for writing and debugging assembly language programs, comprising writing a source code file containing at least one high-level instruction; debugging a source code file containing at least one high-level instruction; substituting high-level instructions in the source code file with assembly language instructions; and debugging the resultant hybrid source code file containing both high-level and assembly language instructions.

BRIEF DESCRIPTION OF THE DRAWINGS

The invention is herein described, by way of example only, with reference to the accompanying drawings, wherein.

BRIEF DESCRIPTION OF THE INVENTION

Figure 1:
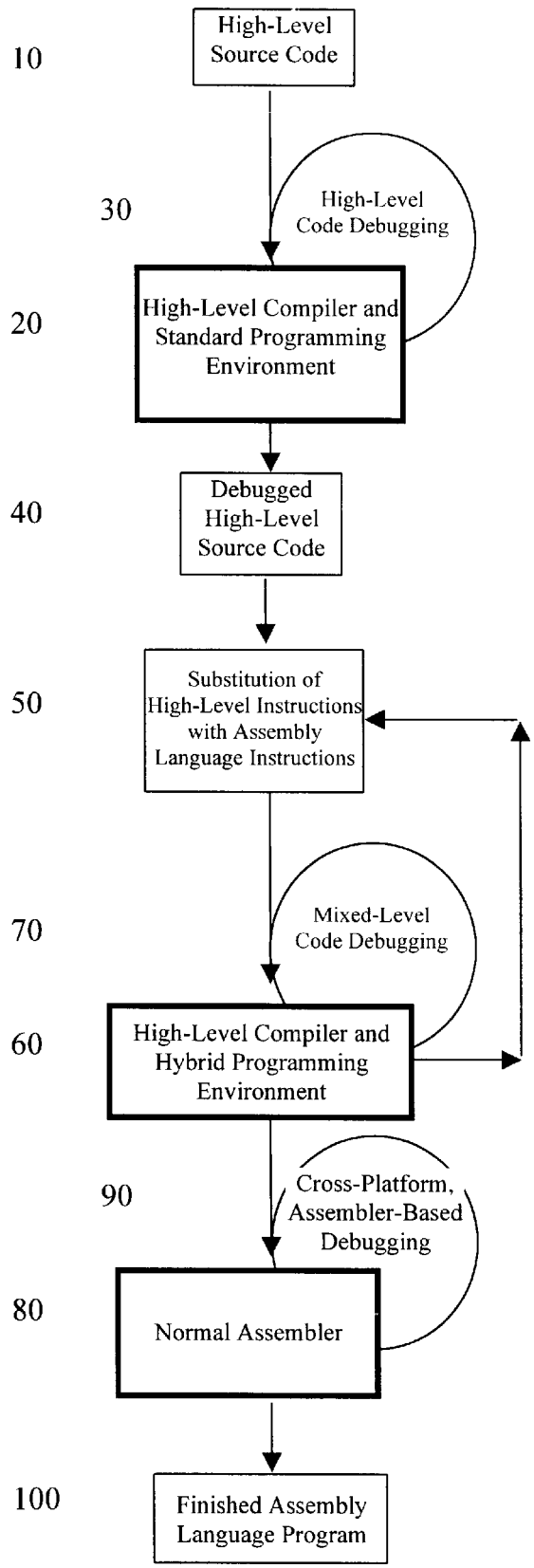
FIG. 1 is a block diagram illustrating the steps in the assembly language programming process provided by the present invention.

In the present invention, the programmer first uses a high-level compiler and programming environment to compile and debug a program written in a high-level language. The programmer debugs the high-level program code until the programmer is satisfied with the resultant high-level code. The programmer then gradually substitutes assembly language instructions for high level instructions, and debugs the results, until all the high level instructions have been replaced with assembly language instructions.

The hybrid programming environment of the present invention is a high-level language compiler that is provided with a library of functions that emulate assembly language instructions. These functions are written as groups of the compiler's standard high-level language instructions, and therefore can be used together with the standard high-level language instructions. The functions in the special library provided by the present invention mimic the operations of assembly language instructions. The library is made available to the compiler, along with any other libraries, by adding it to the list of libraries recognized by the compiler, and requires no specialized hardware.

The computer programmer starts the programming process by entering a program, written in high-level programming language instructions, into a computer file. This file is called the source code. The programmer then compiles the source code using a standard high-level programming language compiler. After correcting any errors, the programmer recompiles the source code. This process is repeated until a compiled file is produced.

The programmer then links the compiled file using a standard linker, to produce an executable program. The programmer tests this program for conformance with the design specifications. The programmer corrects any deviations from the design specifications by modifying the source code, and then repeating the compiling and linking steps. The programmer repeats this process until the programmer is satisfied that the source code correctly implements the design specifications.

The programmer then substitutes some of the high-level instructions with assembly language instructions, producing hybrid source code containing both high-level and assembly language instructions. The programmer compiles and links the hybrid source code, using the special library of functions which allow the compiler to compile the assembly language instructions together with the high-level instructions. After testing the resultant executable program, the programmer makes any necessary modifications to the assembly language instructions introduced into the hybrid source code, and repeats the compiling and linking steps.

In this manner, the programmer gradually replaces all high-level instructions with assembly language instructions.

In the final step in the process, the programmer assembles and debugs the assembly language program using the normal assembler for the contemplated microprocessor.

DESCRIPTION OF THE PREFERRED EMBODIMENTS

The present invention is a hybrid programming environment which enables programmers to write programs containing both high-level and assembly language instructions.

The principles and operation of a hybrid programming environment according to the present invention may be better understood with reference to the drawings and the accompanying description.

Referring now to the drawings, FIG. 1 shows the present invention used in a hybrid high-level and assembly language programming process.

Blocks 10–40 represent prior art. They show the traditional high-level computer language programming process, wherein a programmer writes a high-level source code program, and uses a traditional high-level language compiler and programming environment to compile and debug the source code, producing a debugged high-level source code program.

Block 10 represents the program written by the programmer in a high-level programming language (such as C or C++) to implement the underlying algorithm of the desired program. This program is referred to as the source code.

Block 20 represents the compiler and programming environment used by the programmer to compile and debug the high-level source code program represented by Block 10. This could be a normal compiler and programming environment, or it could be the compiler and programming environment offered by the present invention. In either case, the compiler and programming environment can be common software tools used on standard personal computers used for software development.

The compiler contains a library of industry-standard functions, as well as other specialized libraries purchased or defined by the programmer. As an example, a specialized library might contain functions useful for programming word processing software. Such a library would contain functions that display letters and words in various orientations on the page, or that search for words in a document, or that correct the spelling of words in a document.

The compiler is a program that reads the source code file line by line, translating each instruction into assembly language instructions. The compiler then places those assembly language instructions into a file called an object file. The assembly language instructions generated by the compiler would be matched to the microprocessor in the development personal computer.

Other parts of the programming environment, notably the linker, are used to produce an executable program from the object file produced by the compiler. The result of this compiling and linking process is an executable program.

Block 30 represents the high-level debugging process. This process consists of testing the executable program compiled in the compilation process of Block 20, and comparing the results with those intended by the programmer. If the results do not match those intended by the programmer, the programmer finds the high-level instructions in the source code responsible for that behavior and modifies it.

In order to find the high-level instructions responsible for unwanted behavior, the programmer makes use of common high-level debugging tools. One such tool is the setting of break points in the program. At these points, execution stops, enabling the programmer to inspect the values of variables used in the program. Another such tool is the setting of breaks in program execution triggered when variables are set to values specified by the programmer. Another debugging tool is the ability of the programmer to execute a program instruction by instruction, allowing the programmer to inspect both the values of variables and the flow of execution of instructions through the program.

The programmer then re-compiles the source code. The programmer repeats this debugging process until the programmer is satisfied with the resultant source code.

Block 40 shows the debugged high-level programming language code that is the result of the high-level debugging process shown in Block 30. This is where the normal high-level language programming process stops.

Block 50 shows the process where the programmer starts to substitute assembly language instructions for high-level programming language instructions. The result is a hybrid source code file, containing both assembly and high-level language instructions.

Block 60 shows the present invention, which is a standard high-level programming language compiler with a library of functions which define assembly language instructions in terms of the high-level programming language compiled by the compiler. This library enables the compiler to compile hybrid source code files consisting of both high-level language and assembly language instructions. The programmer uses the compiler to compile an executable program from the hybrid program code containing both high-level and assembly language instructions resulting from the process represented in Block 50.

Block 70 represents the debugging process for the hybrid code resulting from the process shown in Block 50. As with the high-level debugging process represented by Block 20, the programmer compares the results of the executable program prepared using the hybrid programming environment in Block 60 with those intended by the programmer, makes the appropriate corrections to the source code in Block 50, and then re-compiles the source code. In debugging the hybrid code, the programmer makes use of the rich set of debugging tools available in the high-level programming environment.

These processes are repeated until the executable program derived from the hybrid source code performs as intended by the programmer.

The programmer then returns to the process shown in Block 50, replacing other high-level programming instructions with assembly language programming instructions, and repeats the processes shown in Blocks 60 and 70, until all high-level code has been replaced with assembly language code and the resultant source code file, containing assembly language instructions only, has been completely debugged.

Block 80, showing the assembly language assembler program, and Block 90, showing the assembly language debugger, represent the final steps in the process, wherein the programmer assembles and debugs the assembly language program in the source code file using the normal assembler and debugging tools for the contemplated microprocessor.

It will be appreciated that the above descriptions are desired only to serve as examples, and that many other embodiments are possible within the spirit and the scope of the present invention.

What is claimed is:

1. An assembly language design method for writing and debugging assembly language programs comprising:
    (a) providing a function library of functions, which emulate assembly language instructions in terms of a plurality of high-level programming language instructions;
    (b) writing a high-level language source code file containing at least one of said plurality of high-level programming language instructions;
    (c) debugging said high-level language source code file until at least one of said plurality of high-level programming language instructions functions correctly;
    (d) replacing said at least one high-level programming language instruction with assembly language instructions to generate a hybrid source code file containing both assembly and high-level language instructions;
    (e) compiling said hybrid source code file by means of a high level programming language compiler and a predetermined function library, wherein said hybrid source code file is parsed, said assembly language instructions in said hybrid source code file are converted into high-level programming language instructions, and said high-level programming language instructions are translated into machine language instructions of an executable program; and
    (f) debugging said executable program.

2. A system for writing and debugging assembly language programs, comprising:
    (a) a predetermined function library of functions, which emulate assembly language instructions in terms of a plurality of high-level programming language instructions;
    (b) a high-level language source code file containing at least one of said plurality of high-level programming language instructions;
    (c) debugging means for debugging said high-level language source code file and for producing at least one correctly functioning high-level programming language instruction;
    (d) a hybrid source code file generated by replacing said at least one correctly functioning high-level programming language instruction with assembly language instructions;
    (e) a high level programming language compiler for compiling said hybrid source code using said predetermined library of functions, and for generating an executable program; and
    (f) an executable program debugger for debugging said executable program.

* * * * *